(12) United States Patent
Sugai

(10) Patent No.: US 7,792,658 B2
(45) Date of Patent: *Sep. 7, 2010

(54) ELECTRONIC PEDOMETER

(75) Inventor: Yoshinori Sugai, Chiba (JP)

(73) Assignee: Seiko Instruments Inc. (JP)

( * ) Notice: Subject to any disclaimer, the term of this patent is extended or adjusted under 35 U.S.C. 154(b) by 382 days.

This patent is subject to a terminal disclaimer.

(21) Appl. No.: 11/879,879

(22) Filed: Jul. 19, 2007

(65) Prior Publication Data
US 2007/0265800 A1 Nov. 15, 2007

Related U.S. Application Data

(63) Continuation of application No. 11/109,033, filed on Apr. 19, 2005, now Pat. No. 7,263,461.

(30) Foreign Application Priority Data
Apr. 20, 2004 (JP) ............................. 2004-124657

(51) Int. Cl.
G01C 21/00 (2006.01)
G01C 22/00 (2006.01)
(52) U.S. Cl. .................... 702/160; 702/141; 377/24.2
(58) Field of Classification Search .................. 702/160
See application file for complete search history.

(56) References Cited

U.S. PATENT DOCUMENTS

| 4,855,942 | A  | * | 8/1989 | Bianco ........................ 702/160 |
| 7,212,943 | B2 | * | 5/2007 | Aoshima et al. ............ 702/141 |
| 7,263,461 | B2 | * | 8/2007 | Sugai ........................ 702/150 |

FOREIGN PATENT DOCUMENTS

| JP | 02002775 | 1/1990 |
| JP | 2004054704 | 2/2004 |

* cited by examiner

Primary Examiner—Jonathan C. Teixeira Moffat
(74) Attorney, Agent, or Firm—Adams & Wilks

(57) ABSTRACT

To realize miniaturization and detection of a walk state in which no arm is swung in an electronic pedometer in which at least a walk sensor is used in a state of being worn on a wrist. An acceleration sensor is disposed so that a sensitivity axis of the acceleration sensor is located in a range of 30° or smaller in a counterclockwise direction from the direction of 90° with respect to a longitudinal direction of a belt. A user of an electronic pedometer wears the electronic pedometer on his/ her left wrist using the belt and starts processing for counting the number of steps by manipulating a manipulation portion, and also starts to walk, thereby starting counting the number of steps. The user checks the counted number of steps and the measured time period based on displayed contents on a step number display portion and a time display portion of a display portion.

6 Claims, 11 Drawing Sheets

SENSITIVITY AXIS 90°

SENSITIVITY AXIS 75°

SENSITIVITY AXIS 60°

SENSITIVITY AXIS 45°

ELECTRONIC PEDOMETER

CROSS REFERENCE TO RELATED APPLICATION

The present application is a continuation of prior U.S. application Ser. No. 11/109,033, filed on Apr. 19, 2005 now U.S. Pat. No. 7,263,461, which is hereby incorporated by reference, and priority thereto for common subject matter is hereby claimed.

BACKGROUND OF THE INVENTION

1. Field of the Invention

The present invention relates to an electronic pedometer for measuring the number of steps by detecting a walk of a person or the like.

2. Description of the Prior Art

Heretofore, there has been developed an electronic pedometer for measuring the number of steps of a user by detecting a walk of the user using a walk sensor.

A watch type pedometer which is used by being worn on a wrist of a user like a watch has been developed as the electronic pedometer (refer to Patent Document 1 for example).

With the above conventional watch type electronic pedometer, since a pendulum sensor is used, the number of steps can be measured in a normal walk in which a user walks while he/she naturally swings his/her arms. However, there is encountered a problem that the number of steps cannot be measured in a case where a user walks with his/her arm being fixed to a predetermined position (e.g., at the ear) without swinging his/her arms, for example, in a case where the user walks while he/she communicates with someone using his/her mobile telephone.

In addition, while not being of a watch type, a product has also been developed with which the number of steps can be measured even in a state in which no arm is swung as in a state in which an electronic pedometer is held in pocket or the like. In this case, two sensors are used and are disposed so as to perpendicularly intersect each other. As a result, the number of steps can be measured even in a state in which the electronic pedometer is held in a pocket or the like. However, there is encountered a problem in that a volume increases and circuits for amplifying signals from the sensors are required to be doubled in number because the two sensors are used, or when the electronic pedometer is driven in a time division manner in order to prevent such a situation, a time period required to drive the circuits increases, and hence the electronic pedometer of this type is unsuitable for the watch type pedometer.

<Patent Document 1> JP 2002-221434 A

It is an object of the present invention to provide an electronic pedometer, used at least by wearing a walk sensor on a wrist, which is capable of being miniaturized and of detecting a walk in a state in which no arm is swung.

SUMMARY OF THE INVENTION

According to the present invention, there is provided an electronic pedometer having: a walk sensor for detecting a walk of a user to output a walk signal corresponding to the walk; calculation means for calculating the number of steps of the user based on the walk signal; and a belt with which at least the walk sensor is worn on a wrist of the user, the walk sensor being used at least by being worn on the wrist of the user using the belt, wherein the walk sensor is disposed so that a sensitivity axis of the walk sensor is located in a range of 30° or smaller in a counterclockwise direction from 90° with respect to a longitudinal direction of the belt, or in a range of 30° or smaller in a clockwise direction from 90° with respect to the longitudinal direction of the belt.

A walk sensor is disposed so that a sensitivity axis of the walk sensor is located in a range of 30° or smaller in a counterclockwise direction from 90° with respect to a longitudinal direction of a belt, or in a range of 30° or smaller in a clockwise direction from 90° with respect to the longitudinal direction of the belt. A user of the electronic pedometer uses the electronic pedometer at least by wearing the walk sensor on a wrist of the user using the belt.

Here, when the walk sensor is disposed so that the sensitivity axis of the walk sensor is located in the range of 30° or smaller in the counterclockwise direction from 90° with respect to the longitudinal direction of the belt, the walk sensor is preferably used by being worn on the left wrist of the user, and when the walk sensor is disposed so that the sensitivity axis of the walk sensor is located in the range of 30° or smaller in the clockwise direction from 90° with respect to the longitudinal direction of the belt, the walk sensor is preferably used by being worn on the right wrist of the user.

In addition, the walk sensor is preferably an acceleration sensor.

In addition, the electronic pedometer may include timing means for timing time.

BRIEF DESCRIPTION OF THE DRAWINGS

A preferred form of the present invention is illustrated in the accompanying drawings in which.

DETAILED DESCRIPTION OF THE PREFERRED EMBODIMENTS

An electronic pedometer according to an embodiment mode of the present invention is a watch type electronic pedometer which is used by being worn on a wrist of a user. The watch type electronic pedometer has: an acceleration sensor as a walk sensor for detecting a walk of a user to output a walk signal corresponding to the walk; calculation means for calculating the number of steps of the user based on the walk signal; and a belt with which at least the acceleration sensor is worn on a wrist of the user, and is used at least by wearing the acceleration sensor on the wrist of the user using the belt. The electronic pedometer according to this embodiment mode will hereinafter be described with reference to the drawings.

Figure 1:
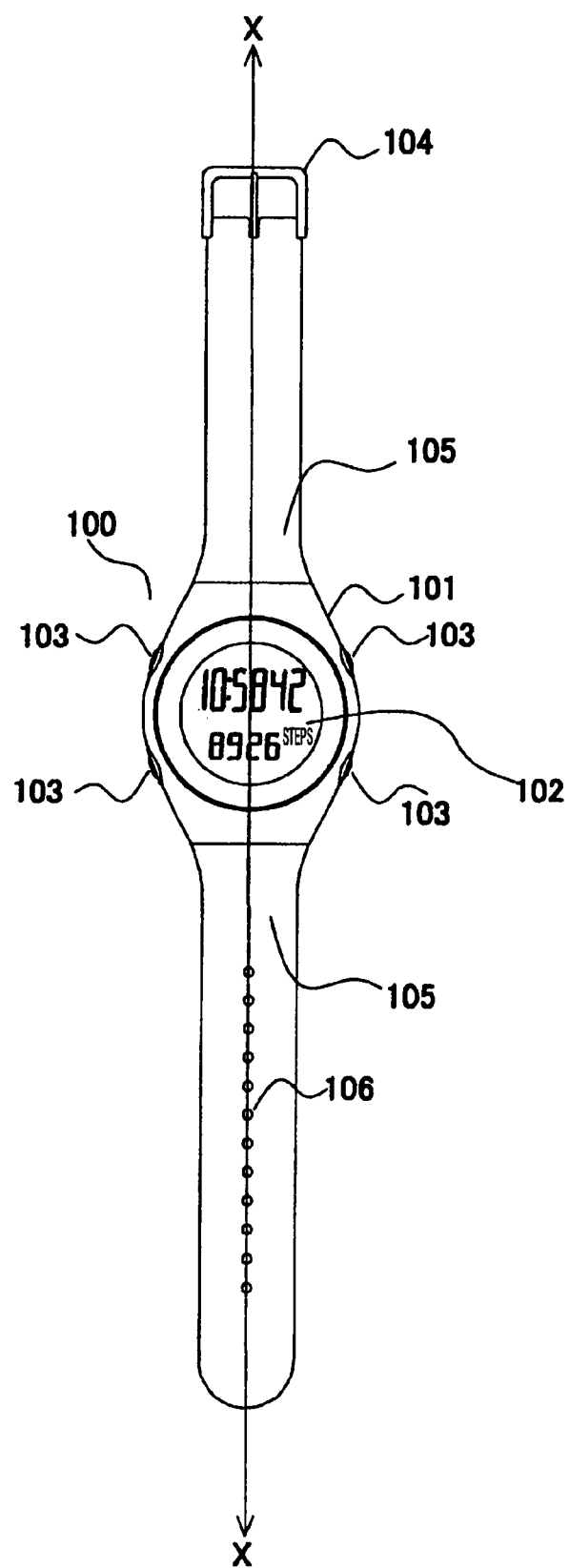
FIG. 1 is a front view showing an external appearance of an electronic pedometer according to an embodiment mode of the present invention.

FIG. 1 is a front view showing an external appearance of an electronic pedometer according to an embodiment mode of the present invention, and shows an electronic pedometer for a left wrist which is used by being worn on a left wrist of a user. In addition, FIG. 2 is a partially enlarged view of FIG. 1.

Figure 2:
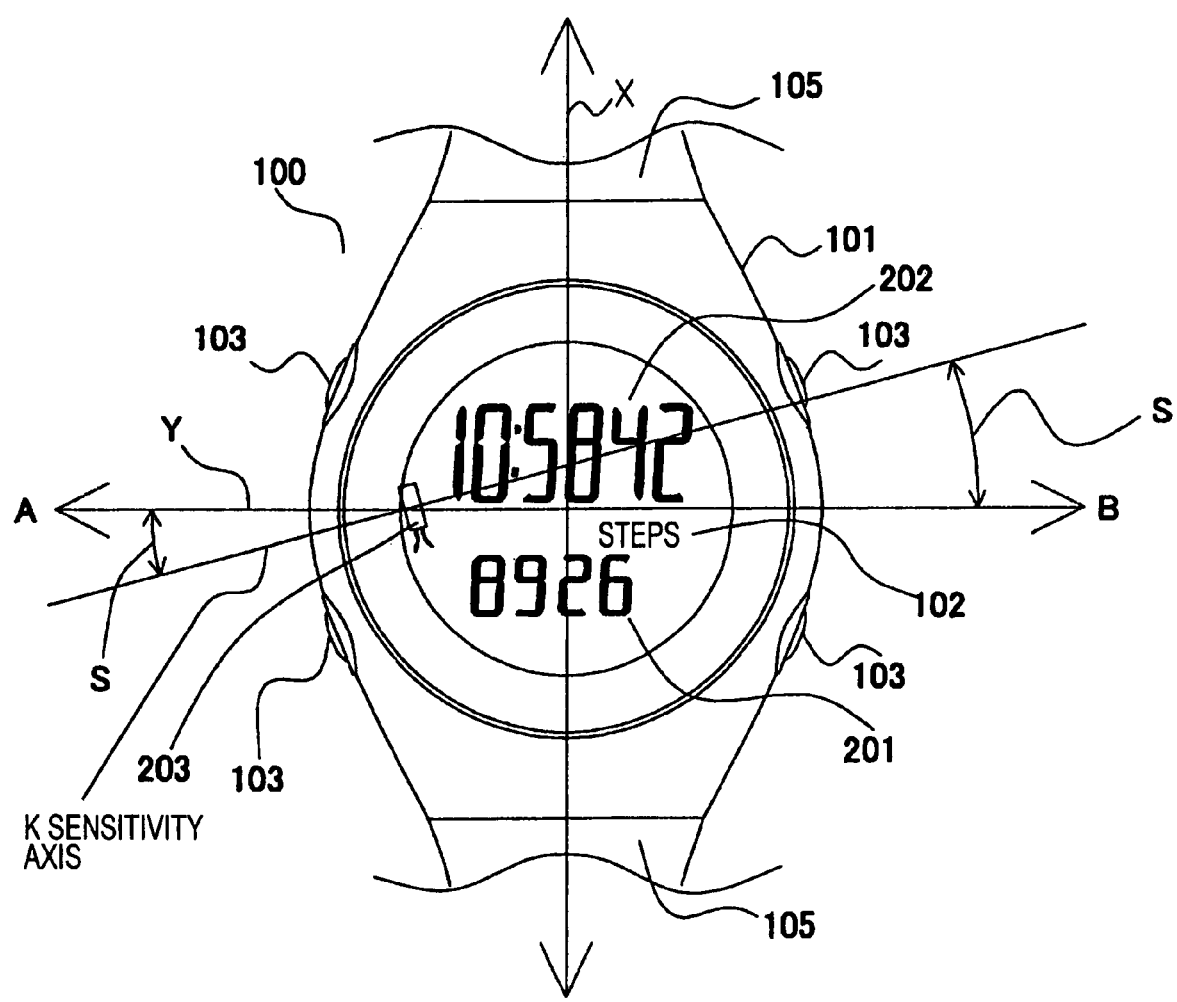
FIG. 2 is a partially enlarged front view showing the external appearance of the electronic pedometer according to the embodiment mode of the present invention.

In FIGS. 1 and 2, an electronic pedometer 100 includes an electronic pedometer main body 101 having a display portion 102 and a manipulation portion 103 which can be manipulated from the outside, a belt, strap or band 105 (referred to hereinafter as belt) which is constituted by a main portion and buttons and with which the electronic pedometer main body 101 is worn on a wrist of a user, and a buckle 104 provided at an end portion of the belt 105.

The display portion 102 has a step number display portion 201 for displaying thereon the number of steps which a user has taken, and a time display portion 202 for displaying thereon data on a time, a walk time period, and the like.

A plurality of small holes 106 are formed in the belt 105. The electronic pedometer main body 101 is worn on the arm of a user by engaging suitable one of the small holes 106 with the buckle 104.

An acceleration sensor 203 as a walk sensor for detecting a walk level of a user is provided inside the electronic pedometer main body 101. The acceleration sensor 203 used herein is an element able to detect an acceleration, and is called a shock sensor, an impact sensor, a vibration sensor or the like. Various kinds of acceleration sensors which are of a bimorph type, of unimorph type, of a piezo type, and the like can be used.

In addition, the electronic pedometer main body 101 includes in its inside calculation means for calculating the number of steps of a user based on a walk signal which corresponds to a walk and which is outputted from the acceleration sensor 203, timing means for timing, display driving means for displaying data on the accumulated number of steps of a user calculated by the calculation means, data on a time measured by the timing means, and the like on the display portion 102, and the like.

While the details of amounting angle of the acceleration sensor 203 to the belt 105 will be described later, since the electronic pedometer 100 shown in FIGS. 1 and 2 is an electronic pedometer for a left wrist, the acceleration sensor 203 is disposed in a position where when the electronic pedometer main body 101 is viewed from the display portion 102 side, a sensitivity axis K of the acceleration sensor 203 is located in a range S of 30° or smaller in a counterclockwise direction from a direction Y making 90° with respect to a longitudinal direction X of the belt 105. Note that when a movement direction of the acceleration sensor 203 or a direction along which a mechanical shock is applied to the acceleration sensor 203 is aligned with the sensitivity axis K, the detection sensitivity becomes maximum.

When the electronic pedometer 100 is worn on a left wrist, a palm is on a B side and an elbow is on an A side.

It should be noted that in a case of a watch type electronic pedometer for a right arm which is used in a state of being worn on a right wrist, the acceleration sensor 203 is disposed in a position where when the electronic pedometer main body 101 is viewed from the display portion 102 side, the sensitivity axis K of the acceleration sensor 203 is located in a range of 30° or smaller in a clockwise direction from the direction Y making 90° with respect to the longitudinal direction X of the belt 105. When the electronic pedometer 100 is worn on a right wrist, a palm is on the A side and an elbow is on the B side.

In this embodiment mode, a watch type electronic pedometer needs to be constructed so that in order to make countable the number of steps in a walk in a state in which a user's hand is put into a pocket or such a walk that a user communicates with someone using his/her mobile telephone on a walk other than a normal walk (a walk in which a user normally walks while he/she swings his/her arms), any of signals generated through arm swing is not detected, and only a signal representing vertical movement of the body is detected as much as possible. While an arm swinging form during a normal walk depends on persons, generally, arms are largely swung forward and are less swung backward.

In addition, the vertical movement of the body is caused when a foot is landed on the earth. Thus, in a state in which a person normally walks, when a hand's position is in the foremost portion and in the rearmost portion in accordance with back and forth swing of an arm, a foot is landed on the earth to cause the vertical movement of the body.

Figure 3:
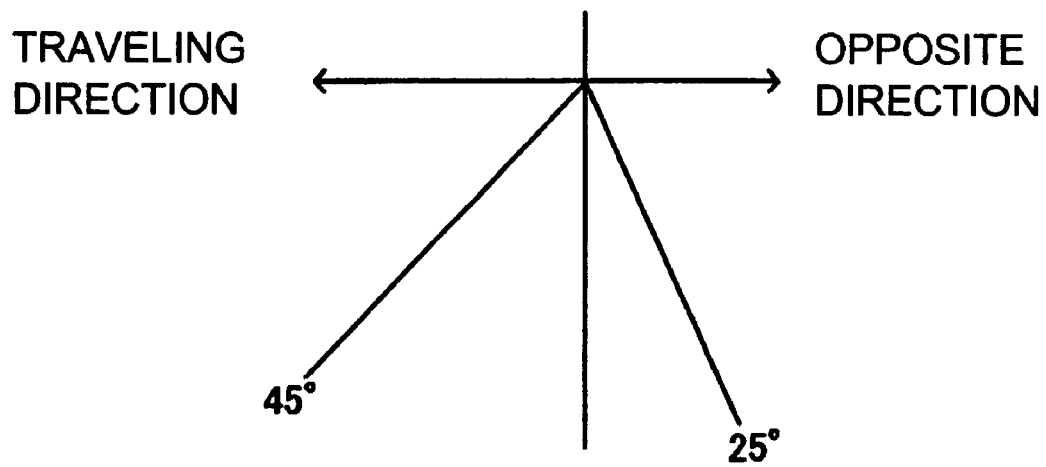
FIG. 3 is a diagram showing a maximum value of an arm swing angle range in a normal walk of a general walker.
Figure 4:
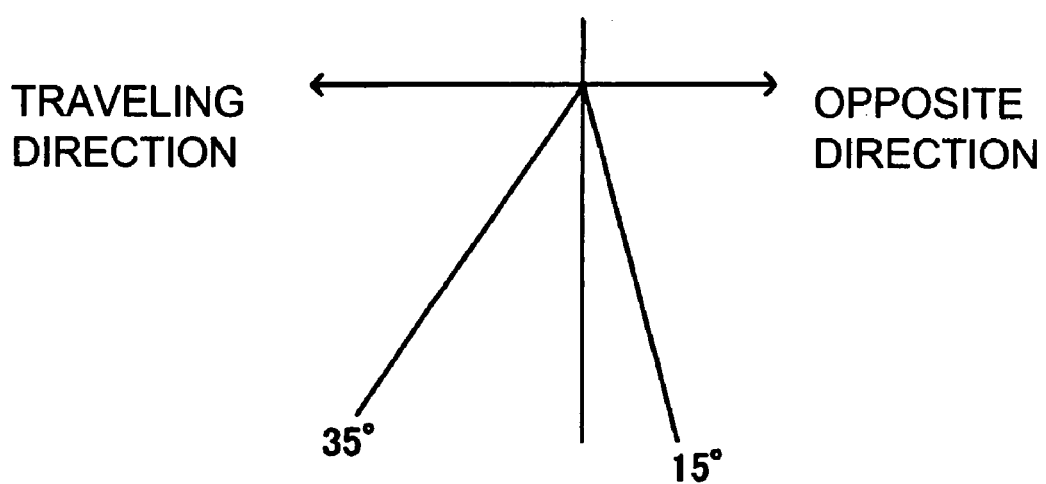
FIG. 4 is a diagram showing an arm swing angle range of 80% of persons.

FIG. 3 is a diagram showing a maximum value in an arm swing angle range in a normal walk of a general walker, and FIG. 4 is a diagram showing an arm swing angle range of 80% of persons. As shown in FIGS. 3 and 4, while the arm swing angle range of a person is generally equal to or smaller than 45° in a traveling direction, the arm swing angle range of 80% of persons is equal to or smaller than 35°. While the arm swing angle range of a person is generally equal to or smaller than 25° in the opposite (backward) direction, similarly, 80% of persons show the angle range of 15° or smaller.

Figure 5:
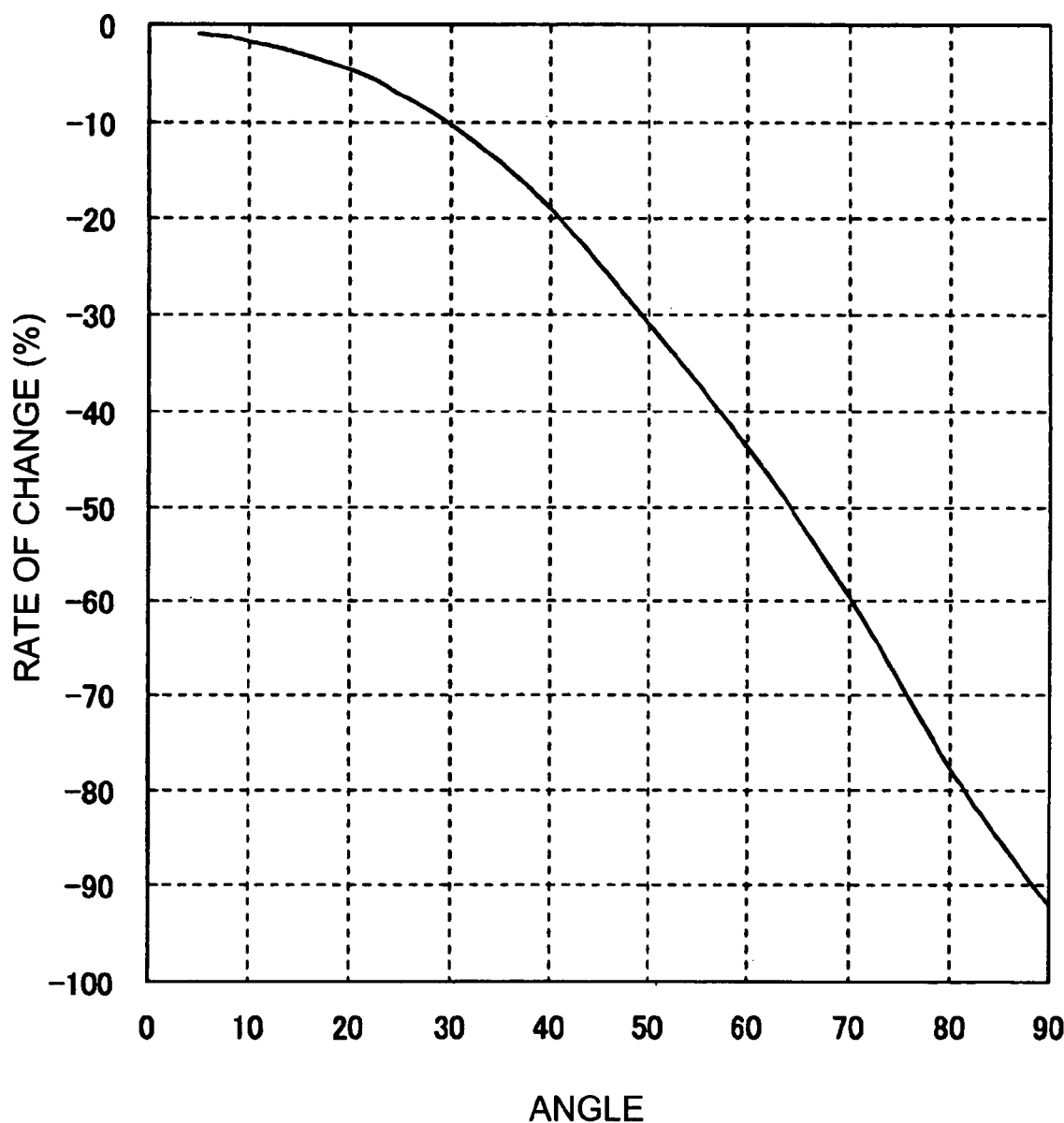
FIG. 5 is a graph showing a situation in which sensitivity changes depending on mounting angles of an acceleration sensor.

FIG. 5 is a graph showing a situation in which the sensitivity changes depending on mounting angles of the acceleration sensor 203. FIG. 5 shows a situation in which the detection sensitivity of the acceleration sensor 203 changes depending on an angle between the sensitivity axis K of the acceleration sensor 203 and the shaking direction (movement direction) of the acceleration sensor 203. In FIG. 5, when the arm is swung in the direction of the sensitivity axis K of the acceleration sensor 203, the sensitivity of the acceleration sensor 203 becomes maximum. It reveals that when the direction of the sensitivity axis K of the acceleration sensor 203 is set at 45° with respect to the movement direction of the acceleration sensor 203, the sensitivity of the acceleration sensor 203 attenuates by 25% from a maximum value.

Figure 6:
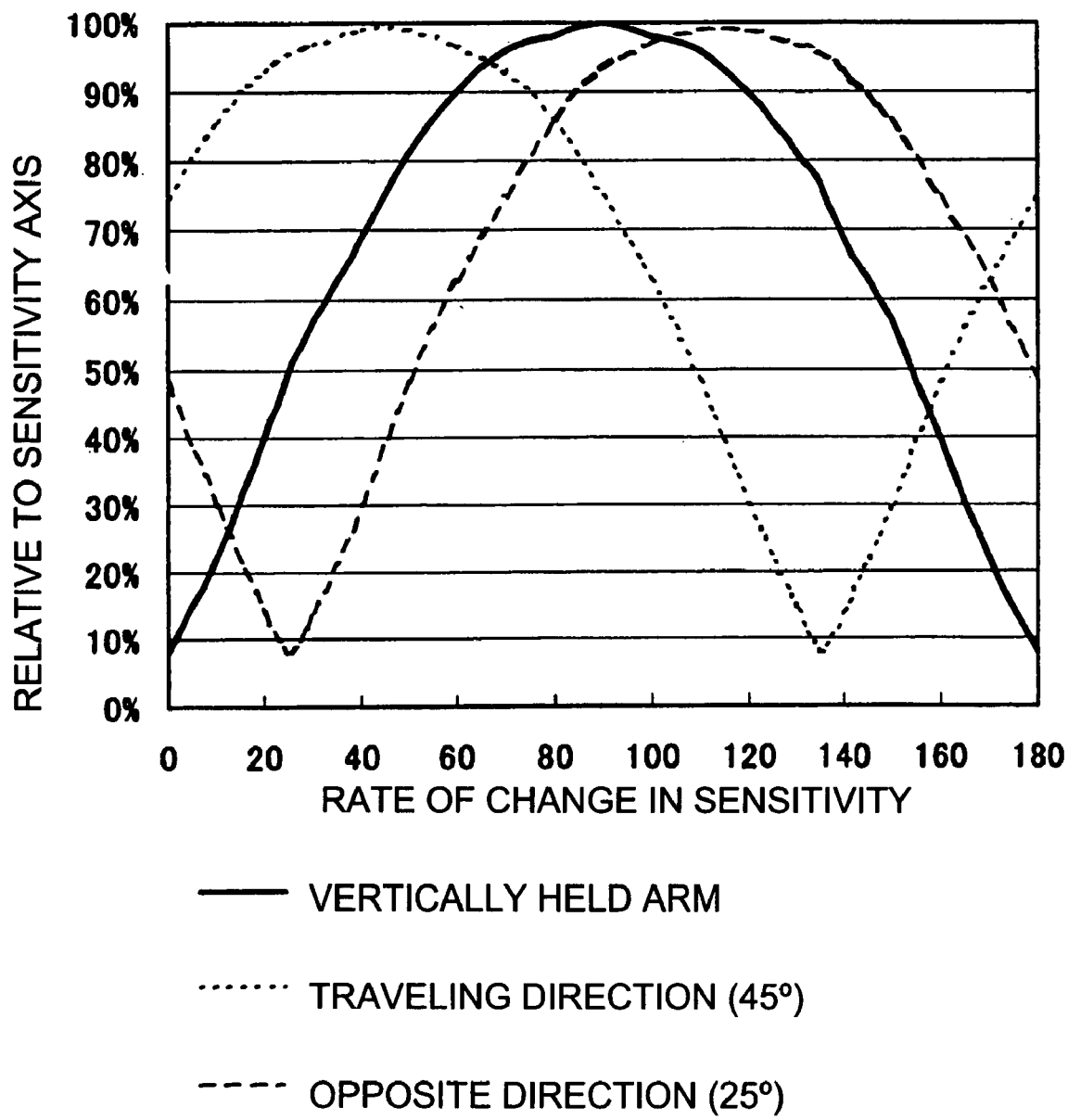
FIG. 6 is a graph showing a change in sensitivity when an arm swing angle is maximum.

FIG. 6 is a graph showing a sensitivity change in a case where the sensitivity axis K of the acceleration sensor 203 is changed when the arm swing angle of a user has the maximum value (at 45° in the traveling direction and at 25° in the backward direction). In FIG. 6, an axis of abscissa represents an angle of the sensitivity axis K with respect to the longitudinal direction X of the belt 105 when viewed from the display portion 102 side, and an axis of ordinate represents a rate of change in sensitivity with a maximum value of the sensitivity of the acceleration sensor 203 defined as 100%.

In FIG. 6, a solid line represents a rate of change in sensitivity when the vertical movement is carried out in a state in which a left arm having the acceleration sensor 203 worn therein is held upright, or lowered just downwardly (vertical state), a short broken line represents a rate of change in sensitivity when the vertical movement is carried out in a state in which the right and left arms are held up in the traveling direction by 45° from the downward direction (refer to FIG. 3), and a long broken line represents a rate of change in sensitivity when the vertical movement is carried out in a state in which the left arm is held up backward from the downward direction by 25° (−25°) (refer to FIG. 3).

As shown in FIG. 6, it is understood that in a case where the acceleration sensor 203 is worn on the arm so that the sensitivity axis K of the acceleration sensor 203 becomes vertical to the longitudinal direction X of the belt 105, the sensitivity attenuates by 25% from a maximum value when the arm is swung in the traveling direction by 45°, and the sensitivity attenuates by about 7% when the arm is swung backward by 25°. In addition, in a case where the acceleration sensor 203 is disposed so that the sensitivity axis K makes 45° with respect to the longitudinal direction X of the belt 105, the sensitivity becomes maximum when the arm is swung in the traveling direction by 45°. Also, the sensitivity attenuates by about 60% when the arm is swung backward by 25°.

Figure 7:
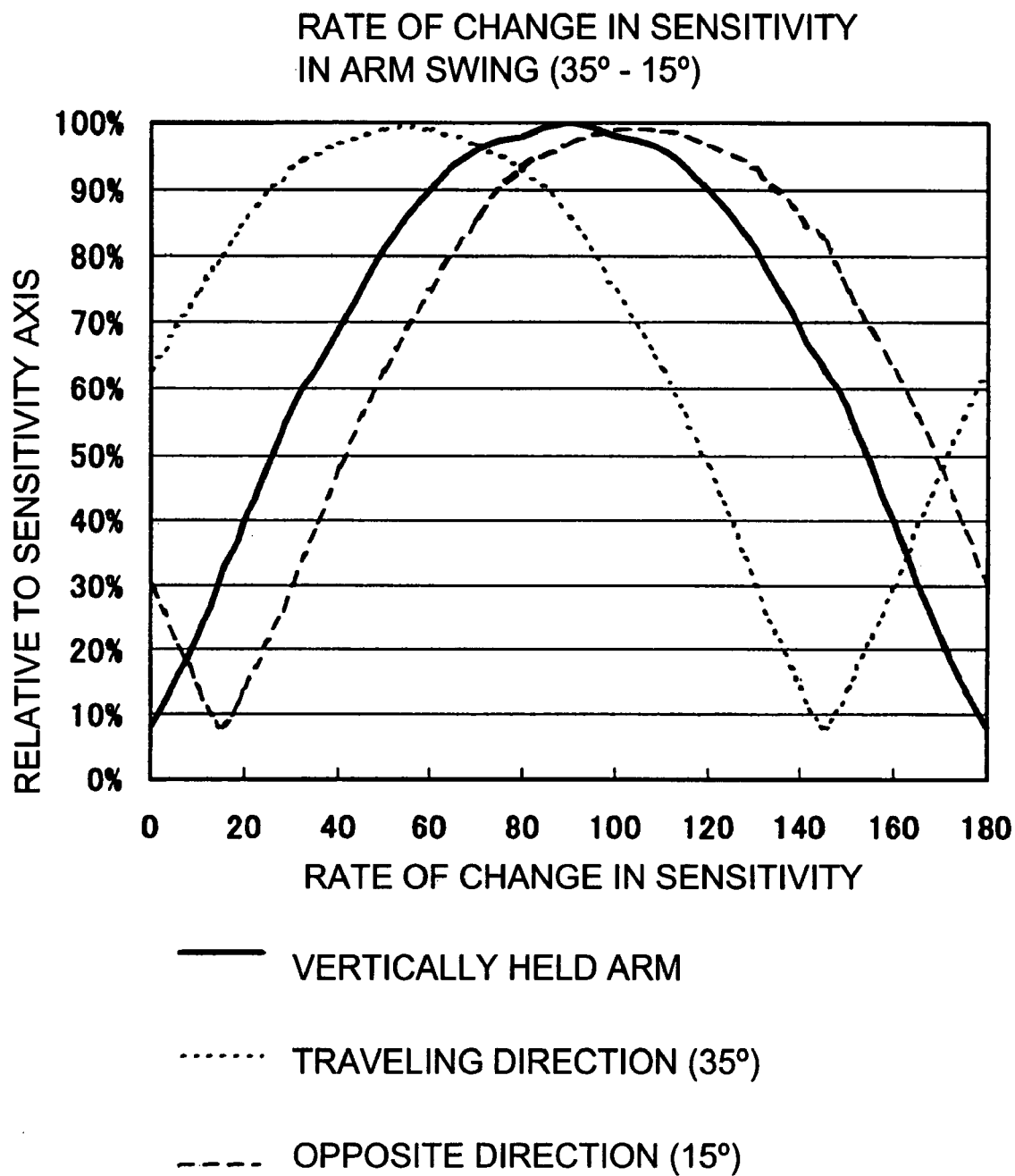
FIG. 7 is a graph showing a change in sensitivity caused by arm swing in 80% of persons.

FIG. 7 is a graph showing a rate of change in sensitivity when the sensitivity axis K of the acceleration sensor 203 is changed in a case where about 80% of persons swing their arms (in the traveling direction by 35° and backward by 15°). Similar to the example of FIG. 6, an axis of abscissa represents an angle of the sensitivity axis K with respect to the longitudinal direction X of the belt 105 when viewed from the display portion 102 side, and an axis of ordinate represents a rate of change in sensitivity with a maximum value of the sensitivity of the acceleration sensor 203 defined as 100%.

In FIG. 7, a solid line represents a rate of change in sensitivity when the vertical movement is carried out in a state in which a left arm having the acceleration sensor 203 worn therein is held upright, or lowered just downwardly (vertical state), a short broken line represents a rate of change in sensitivity when the vertical movement is carried out in a state in which the left arm is held up in the traveling direction by 35° from the downward direction (refer to FIG. 4), and a long broken line represents a rate of change in sensitivity when the vertical movement is carried out in a state in which the left arm is held up backward from the downward direction by 15° (−15°) (refer to FIG. 4).

An angle of the arm of a person communicating with someone using his/her mobile telephone or the like generally becomes 125°. Here, this state shows the same rate of change in sensitivity as that in a state in which the arm is swung in the traveling direction by 35°.

Figure 8:
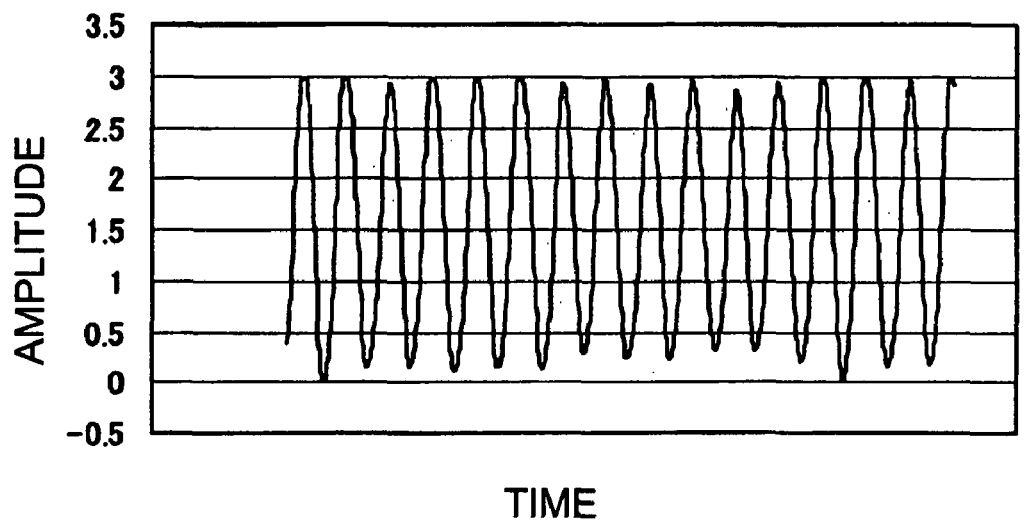
FIG. 8 is a waveform chart showing a waveform of a walk signal from a person for whom a large output is obtained from an acceleration sensor when a sensitivity axis of the acceleration sensor is set at 90°.
Figure 9:
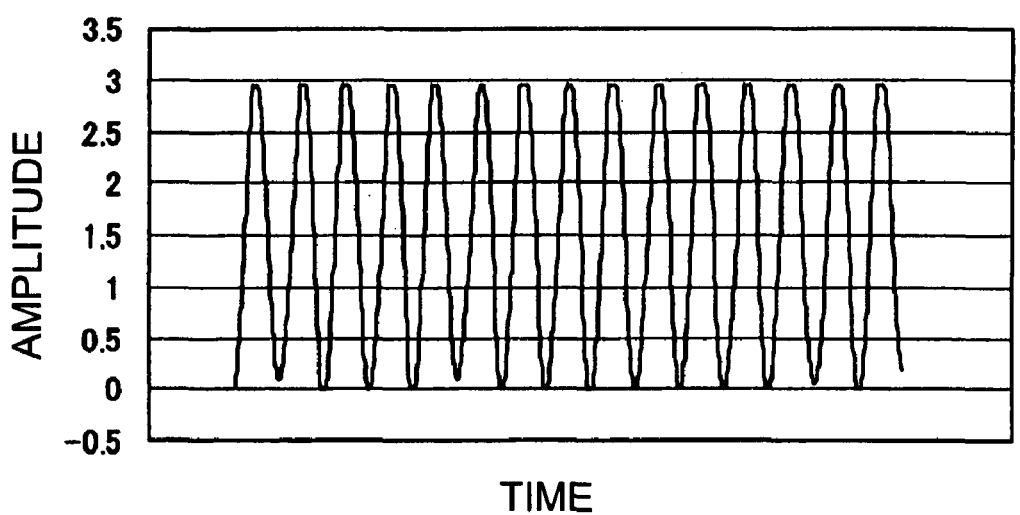
FIG. 9 is a waveform chart showing a waveform of a walk signal from a person for whom a large output is obtained from an acceleration sensor when a sensitivity axis of the acceleration sensor is set at 75°.
Figure 10:
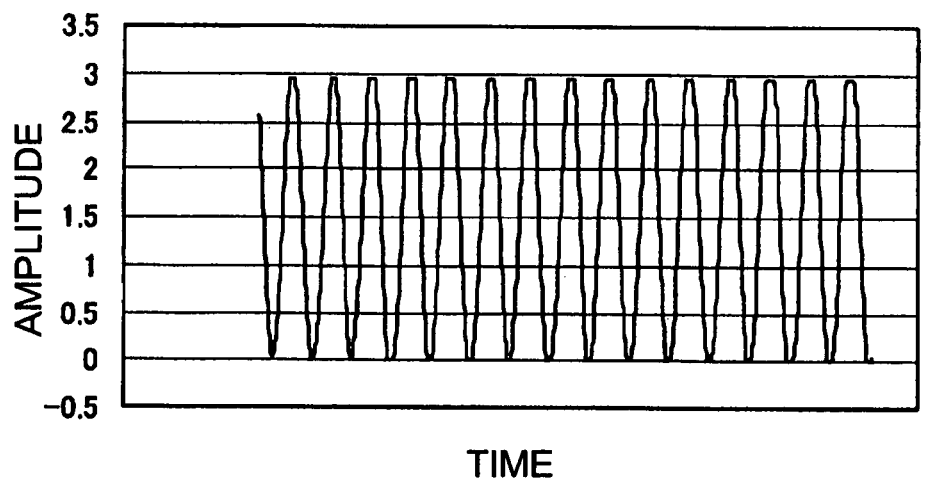
FIG. 10 is a waveform chart showing a waveform of a walk signal from a person for whom a large output is obtained from an acceleration sensor when a sensitivity axis of the acceleration sensor is set at 60°.

FIG. 8 is a waveform chart showing a waveform of a walking signal from a person for whom a large output is obtained from the acceleration sensor 203 in a case where the acceleration sensor 203 is disposed so that the sensitivity axis K of the acceleration sensor 203 makes 90° with respect to the longitudinal direction X of the belt 105 when viewed from the display portion 102 side; FIG. 9 is a waveform chart showing a waveform of a walking signal from a person for whom a large output is obtained from the acceleration sensor 203 in a case where the acceleration sensor 203 is disposed so that the sensitivity axis K of the acceleration sensor 203 makes 75° with respect to the longitudinal direction X of the belt 105 when viewed from the display portion 102 side; FIG. 10 is a waveform chart showing a waveform of a walking signal from a person for whom a large output is obtained from the acceleration sensor 203 in a case where the acceleration sensor 203 is disposed so that the sensitivity axis K of the acceleration sensor 203 makes 60° with respect to the longitudinal direction X of the belt 105 when viewed from the display portion 102 side; and FIG. 11 is a waveform chart showing a waveform of a walking signal from a person for whom a large output is obtained from the acceleration sensor 203 in a case where the acceleration sensor 203 is disposed so that the sensitivity axis K of the acceleration sensor 203 makes 45° with respect to the longitudinal direction X of the belt 105 when viewed from the display portion 102 side.

Figure 11:
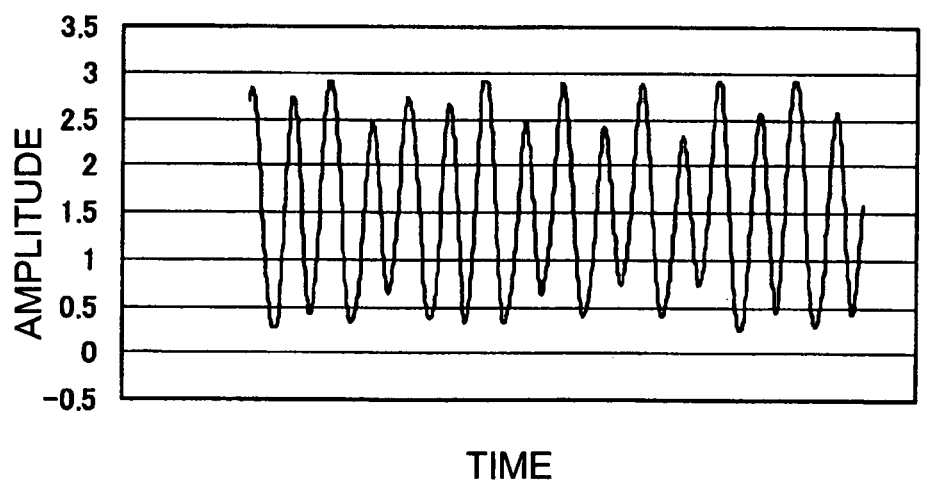
FIG. 11 is a waveform chart showing a waveform of a walk signal from a person for whom a large output is obtained from an acceleration sensor when a sensitivity axis of the acceleration sensor is set at 45°.

In FIGS. 8 to 11, each peak of the walking signal represents one step. When an angle between the sensitivity axis K and the longitudinal direction X of the belt 105 is in a range of 90° to 60°, satisfactory signal waveforms are obtained (FIGS. 8 to 10). However, as shown in FIG. 11, when the angle between the sensitivity axis K and the longitudinal direction X of the belt 105 is 45°, each peak of the walk signal corresponding to a walk detected when the arm (the left arm in this embodiment mode) having the electronic pedometer 100 worn therein is swung in the traveling direction is large, but each peak of the walk signal detected when the arm is swung backward is small. Thus, there is a possibility that the walk measurement becomes unsuitable to cause a measurement error.

Figure 12:
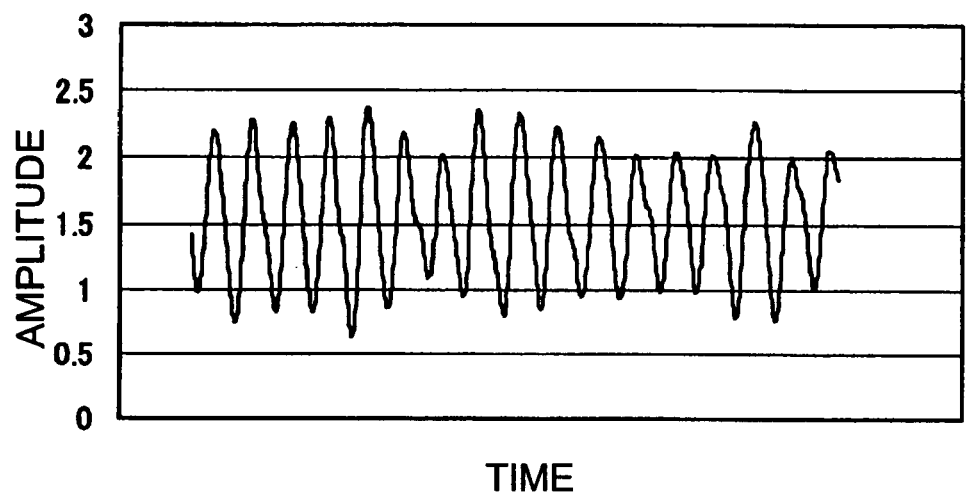
FIG. 12 is a waveform chart showing a waveform of a walk signal from a person for whom a small output is obtained from an acceleration sensor when a sensitivity axis of the acceleration sensor is set at 90°.
Figure 13:
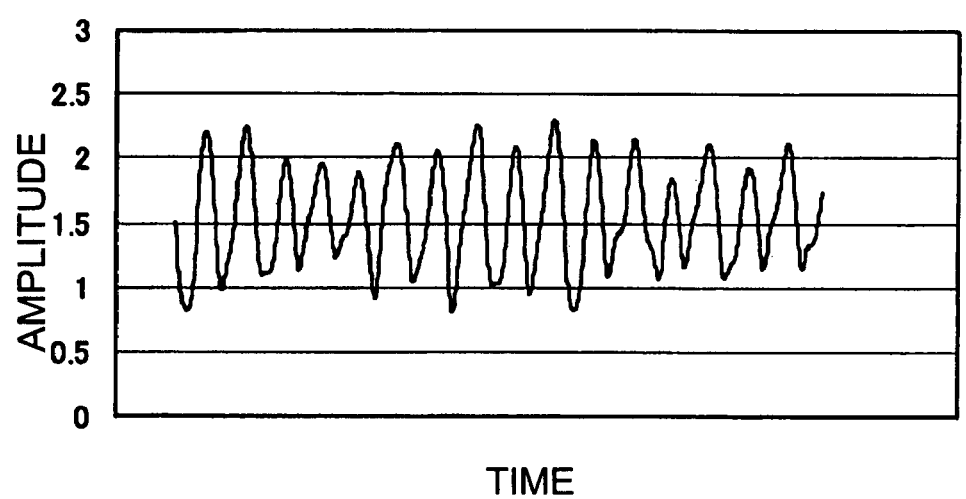
FIG. 13 is a waveform chart showing a waveform of a walk signal from a person for whom a small output is obtained from an acceleration sensor when a sensitivity axis of the acceleration sensor is set at 75°.
Figure 14:
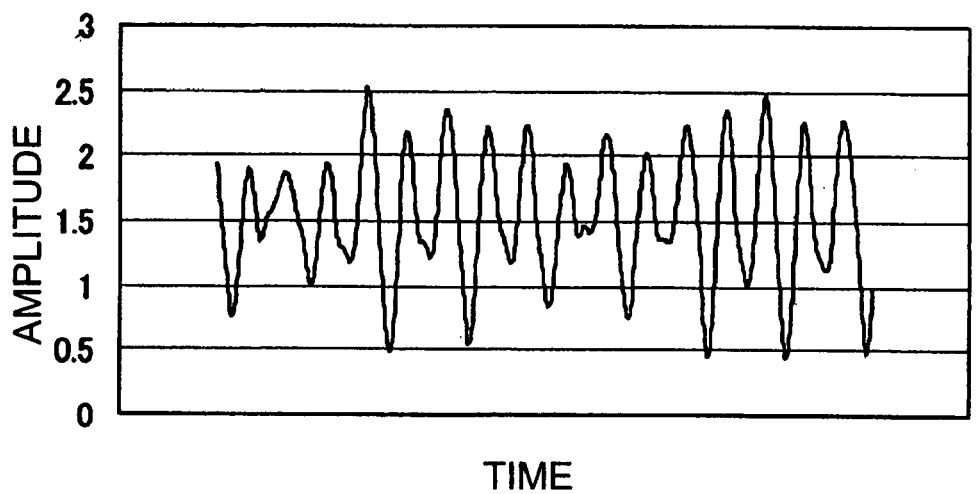
FIG. 14 is a waveform chart showing a waveform of a walk signal from a person for whom a small output is obtained from an acceleration sensor when a sensitivity axis of the acceleration sensor is set at 60°.
Figure 15:
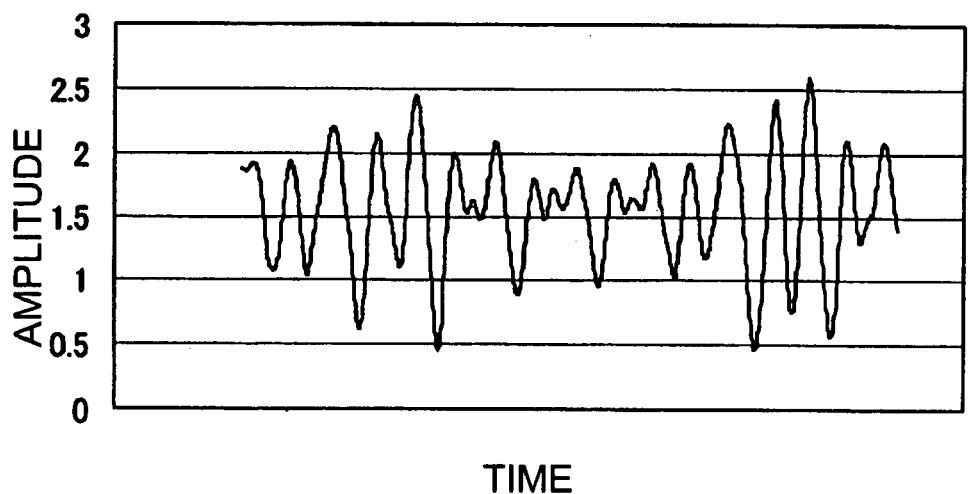
FIG. 15 is a waveform chart showing a waveform of a walk signal from a person for whom a small output is obtained from an acceleration sensor when a sensitivity axis of the acceleration sensor is set at 45°.

FIG. 12 shows a waveform of a walk signal from a person for whom a small output is obtained from the acceleration sensor 203 in a case where the acceleration sensor 203 is disposed so that the sensitivity axis K of the acceleration sensor 203 makes 90° with respect to the longitudinal direction X of the belt 105 when viewed from the display portion 102 side. FIG. 13 shows a waveform of a walk signal from a person for whom a small output is obtained from the acceleration sensor 203 in a case where the acceleration sensor 203 is disposed so that the sensitivity axis K of the acceleration sensor 203 makes 75° with respect to the longitudinal direction X of the belt 105 when viewed from the display portion 102 side. FIG. 14 shows a waveform of a walk signal from a person for whom a small output is obtained from the acceleration sensor 203 in a case where the acceleration sensor 203 is disposed so that the sensitivity axis K of the acceleration sensor 203 makes 60° with respect to the longitudinal direction X of the belt 105 when viewed from the display portion 102 side. FIG. 15 shows a waveform of a walk signal from a person for whom a small output is obtained from the acceleration sensor 203 in a case where the acceleration sensor 203 is disposed so that the sensitivity axis K of the acceleration sensor 203 makes 45° with respect to the longitudinal direction X of the belt 105 when viewed from the display portion 102 side.

In FIGS. 12 to 15, each peak of the signal represents one step similarly to FIGS. 8 to 11. Regarding a person for whom a small output is obtained from the acceleration sensor 203, the satisfactory walk detection signal becomes hard to obtain as the angle between the sensitivity axis K and the longitudinal direction X of the belt 105 becomes smaller. As a result, the walk measurement becomes unstable. Hence, there is a possibility that a large measurement error is caused.

Figure 16:
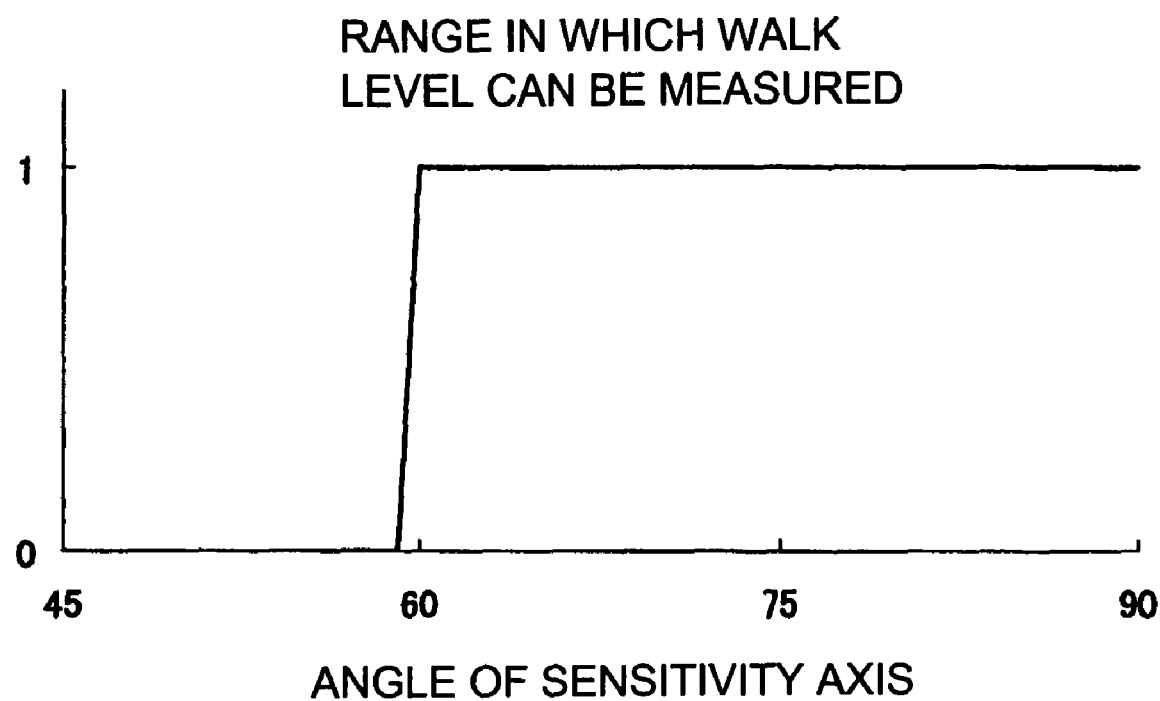
FIG. 16 is a graph showing an angle range of the sensitivity axis of the acceleration sensor in which a walk level can be measured.

FIG. 16 is a characteristic diagram showing a range in which a walk can be measured using the acceleration sensor 203. An axis of abscissa represents an angle between the sensitivity axis K of the acceleration sensor 203 and the longitudinal direction X of the belt 105 when viewed from the display portion 102 side, and an axis of ordinate represents normalized sensitivity of the acceleration sensor 203. As shown in FIG. 16, the acceleration sensor 203 has the satisfactory sensitivity in a region in which the angle of sensitivity axis K is equal to or larger than 60°. In this embodiment mode, the range of the angle between the sensitivity axis K of the acceleration sensor 203 and the longitudinal direction X of the belt 105 when viewed from the display portion 102 side is determined as follows with reference to the characteristic diagram of FIG. 16.

Since in the normal life, a human being does nothing with his/her arms being held backward, a maximum value of the angle between the sensitivity axis K of the acceleration sensor 203 and the longitudinal direction X of the belt 105 when viewed from the display portion 102 side is set as 90°. In addition, in order to allow the walk signal to be detected every step even for a person whose walk signal is at a low level, a minimum value of the angle between the sensitivity axis K of the acceleration sensor 203 and the longitudinal direction X of the belt 105 when viewed from the display portion 102 side is set as 60° (30° in a counterclockwise direction from the direction of 90° with respect to the longitudinal direction X of the belt 105). That is, the sensitivity axis K of the acceleration sensor 203 is set in a range S of 30° or smaller in a counterclockwise direction from the direction of 90° with respect to the longitudinal direction X of the belt 105 when viewed from the display portion 102 side, thereby allowing the number of steps to be satisfactorily counted.

Note that in a case of the watch type electronic pedometer for a right hand as well described above, the sensitivity axis of the acceleration sensor can be set similarly to the foregoing. In the case of the watch type electronic pedometer for a right hand, the sensitivity axis K is set in a range of 30° or smaller in a clockwise direction from the direction of 90° with respect to the longitudinal direction X of the belt 105, thereby making it possible to count the number of steps in a satisfactory manner.

When the number of steps is counted using the watch type electronic pedometer 100 for a left hand constructed as described above, a user of the electronic pedometer 100 wears the electronic pedometer 100 in his/her left wrist using the belt 105, and starts the processing for counting the number of steps by manipulating the manipulation portion 103, and also starts to walk, thereby counting the number of steps. The user checks data on the number of steps and data on a walk time period which are displayed on the step number display portion 201 and the time display portion 202 of the display portion 102, respectively.

When the number of steps is counted using the watch type electronic pedometer for a right hand described above, the number of steps is counted with the electronic pedometer being worn on a right wrist of a user.

As described above, the electronic pedometer according to this embodiment mode includes: an acceleration sensor for detecting a walk of a user to output a walk signal corresponding to the walk; calculation means for calculating the number of steps of the user based on the walk signal; a belt with which the acceleration sensor is worn on a wrist of the user; and a display portion for displaying thereon data on the number of steps calculated by the calculation means, in which the walk sensor being used at least by being worn on the wrist of the user using the belt, the acceleration sensor 203 is disposed so that the sensitivity axis K of the acceleration sensor 203 is located in the range S of 30° or smaller in a counterclockwise direction from the direction of 90° with respect to the longitudinal direction X of the belt 105 when viewed from the display portion 102 side, or in the range of 30° or smaller in a clockwise direction from the direction of 90° with respect to the longitudinal direction X of the belt 105 when viewed from the display portion 102 side.

Here, when the acceleration sensor 203 is disposed so that the sensitivity axis K of the acceleration sensor 203 is located in the range S of 30° or smaller in the counterclockwise direction from the direction of 90° with respect to the longitudinal direction X of the belt 105, the electronic pedometer is used in a state of being worn on a left wrist of the user, while when the acceleration sensor 203 is disposed so that the sensitivity axis K of the acceleration sensor 203 is located in the range S of 30° or smaller in the clockwise direction from the direction of 90° with respect to the longitudinal direction X of the belt 105, the electronic pedometer is used in a state of being worn on a right wrist of the user.

As a result, in the watch type electronic pedometer in which at least the walk sensor is used in a state of being worn on a wrist, the miniaturization becomes possible, and even in walking with no arm being swung, the satisfactory walk detection becomes possible.

Note that while in the above embodiment mode, the construction is adopted in which the electronic pedometer main body 101 is used in a state of being worn on a wrist of a user, a construction may be adopted in which at least the acceleration sensor 203 is worn on a wrist of a user.

The present invention can also be applied to an electronic pedometer which is constructed such that all constituent elements of the pedometer are worn on the user's body when in use, or an electronic pedometer which is constructed such that some (including at least sensors) of constituent elements are worn on the user's body, and other constituent elements wirelessly transmit/receive signals to/from the constituent elements, and the other constituent elements are provided away from the user.

According to the present invention, effects are offered in which miniaturization becomes possible since a walk can be detected using a single walk sensor, and a walk in a state in which no arm is swung can be detected since the sensitivity axis of the walk sensor is constructed so as to have a predetermined angle when the electronic pedometer is used.

In addition, it becomes possible to construct the electronic pedometer having a function as a watch, and to measure almost the numbers of steps in normal life.

What is claimed is:

1. An electronic pedometer comprising: an acceleration sensor that detects acceleration in vertical movement of a user's body during a walking movement of the user to output a walk signal corresponding to the detected acceleration;
    calculation means for calculating a number of walking steps of the user based on the walk signal; and a strap for mounting the electronic pedometer on a wrist of the user's body; wherein the acceleration sensor has a sensitivity axis along which a detection sensitivity by the acceleration sensor of the acceleration in vertical movement of the user's body during the walking movement becomes a maximum; and wherein when the acceleration sensor is mounted on a left wrist of the user's body, the sensitivity axis of the acceleration sensor is located within a range of less than 30 degrees in the counterclockwise direction from an axis disposed at 90 degrees with respect to the longitudinal direction of the strap.

2. An electronic pedometer according to claim 1; further including a display portion that displays the number of walking steps calculated by the calculation means.

3. An electronic pedometer according to claim 2; further including a time display portion that displays time data.

4. An electronic pedometer comprising: an acceleration sensor that detects acceleration in vertical movement of a user's body during a walking movement of the user to output a walk signal corresponding to the detected acceleration; calculation means for calculating a number of walking steps of the user based on the walk signal; and a strap for mounting the electronic pedometer on a wrist of the user's body; wherein the acceleration sensor has a sensitivity axis along which a detection sensitivity by the acceleration sensor of the acceleration in vertical movement of the user's body during the walking movement becomes a maximum; and wherein when the acceleration sensor is mounted on a right wrist of the user's body, the sensitivity axis of the acceleration sensor is located within a range of less than 30 degrees in the clockwise direction from an axis disposed at 90 degrees with respect to the longitudinal direction of the strap.

5. An electronic pedometer according to claim 4; further including a display portion that displays the number of walking steps calculated by the calculation means.

6. An electronic pedometer according to claim 5; further including a time display portion that displays time data.

* * * * *